(12) United States Patent
Kobayashi et al.

(10) Patent No.: US 7,924,563 B2
(45) Date of Patent: Apr. 12, 2011

(54) ELECTRONIC DEVICE

(75) Inventors: Sonomasa Kobayashi, Kawasaki (JP);
Nobuyoshi Yamamoto, Kato (JP)

(73) Assignee: Fujitsu Limited, Kawasaki (JP)

( * ) Notice: Subject to any disclaimer, the term of this patent is extended or adjusted under 35 U.S.C. 154(b) by 258 days.

(21) Appl. No.: 12/146,910

(22) Filed: Jun. 26, 2008

(65) Prior Publication Data
US 2009/0002940 A1    Jan. 1, 2009

(30) Foreign Application Priority Data
Jun. 29, 2007 (JP) .................. 2007-173353

(51) Int. Cl.
*H05K 7/20* (2006.01)

(52) U.S. Cl. ...................... 361/695; 361/694

(58) Field of Classification Search .................. None
See application file for complete search history.

(56) References Cited

U.S. PATENT DOCUMENTS

| 5,762,550 | A * | 6/1998 | Brunner ...................... 454/184 |
| 6,241,007 | B1 * | 6/2001 | Kitahara et al. ............ 165/80.4 |
| 6,311,767 | B1 * | 11/2001 | Inoue et al. .................. 165/80.4 |
| 6,407,921 | B1 * | 6/2002 | Nakamura et al. ............ 361/700 |
| 6,442,025 | B2 * | 8/2002 | Nakamura et al. ............ 361/695 |
| 7,362,568 | B2 * | 4/2008 | Huang ....................... 361/679.48 |
| 7,377,306 | B2 * | 5/2008 | Hashimoto ....................... 165/78 |
| 7,561,417 | B2 * | 7/2009 | Hung et al. ............... 361/679.52 |
| 7,589,965 | B2 * | 9/2009 | Liang et al. .................... 361/695 |
| 7,660,118 | B2 * | 2/2010 | Tatsukami et al. ............ 361/697 |
| 7,710,724 | B2 * | 5/2010 | Takeguchi et al. ............ 361/700 |
| 2002/0075647 | A1 * | 6/2002 | DiFonzo et al. .............. 361/687 |
| 2004/0061999 | A1 * | 4/2004 | Takemoto et al. ............. 361/683 |
| 2007/0131383 | A1 | 6/2007 | Hattori et al. |

FOREIGN PATENT DOCUMENTS

| JP | 2003-078268 | 3/2003 |
| JP | 2004-281484 | 10/2004 |
| JP | 2007-189183 | 7/2007 |

* cited by examiner

*Primary Examiner* — Gregory D Thompson
(74) *Attorney, Agent, or Firm* — Staas & Halsey LLP

(57) ABSTRACT

An electronic apparatus including a housing having an air outlet and a heat generating component in the housing, a heat sink in the housing and having heat radiating fins arrayed. The apparatus includes heat radiating fins having air flow paths between adjacent pairs of the heat radiating fins, and a fan in the housing. The fan feeds air to an air inlet of the heat sink to exhaust heat of the heat radiating fins from the air outlet of the housing. The air outlet of the housing has openings arrayed which divide the air flow paths formed between the pairs of heat radiating fins.

9 Claims, 9 Drawing Sheets

ELECTRONIC DEVICE

CROSS-REFERENCE TO RELATED APPLICATIONS

This application is related to and claims priority to Japanese Patent Application No. 2007-173353 filed on Jun. 29, 2007 in the Japan Paten Office, the entire contents of which are incorporated herein by reference.

BACKGROUND

1. Field

The embodiments discussed herein are related to electronic devices. There are demands with electronic devices such as personal computers for even faster processing speed and greater variety of functions equipped. In order to meet such demands, electronic components in an electronic device have increasingly high performance and high density resulting in an increase of heat generated in the electronic device. Heat accumulated in an electronic device may cause a problem of deterioration of the electronic components and performance. Heat generated in an electronic device needs to be radiated efficiently.

A heat radiating mechanism for radiating heat in an electronic device is used which includes a heat sink and heat radiating fins. The heat sink absorbs heat generated by the electronic components and conducts the heat to an outlet provided in the housing of the electronic device. By feeding air to the outlet, the heat radiating fins make the air absorb heat of the heat sink and the air is exhausted from the outlet. A heat sink may include a heat radiating member and a heat conducting member. The heat radiating member has a plurality of heat radiating fins arrayed at equal intervals. The heat conducting member has a broad surface for conducting heat to the heat radiating member. The arrangement is such that the heat conducting member contacts the electronic components and the heat radiating member faces the outlet. The heat radiating member of the heat sink is interposed between the outlet and a fan which is arranged to feed air to the outlet. Such a heat radiating mechanism being equipped in an electronic device, the heat conducting member of the heat sink efficiently absorbs heat generated by the electronic components and conducts the heat to the heat radiating member, where air from the fan goes through the spaces between each of the plurality of heat radiating fins. As a result, air efficiently absorbs heat and then is exhausted from the outlet, which improves the efficiency of the heat radiation.

2. Description of the Related Art

Conventionally, a heat sink device can have an auxiliary heat radiating member including a plurality of heat radiating fins in the heat sink nearer the fan than the heat radiating member. The plurality of heat radiating fins can be arrayed obliquely with respect to the array of the plurality of heat radiating fins which compose the heat radiating member. Air from the fan may be dispersed by the auxiliary heat radiating member and then enters into the heat radiating member. In this way, this heat sink device can radiate the heat of each of the plurality of heat radiating fins.

A heat radiating member may include a flow path for air formed by the spaces between each of a plurality of heat radiating fins. Air from the fan enters from an air inlet that faces the fan and flows to an air outlet which faces the outlet of the housing to be exhausted out of the housing. If dust or the like caught by the fan clogs the air inlet of the heat radiating member at this time, sufficient air can not be fed into the air flow path between the fins. As a result, the efficiency of the heat radiation may be lowered. An approach to lessen this problem, is to make the interval of the heat radiating fins larger so that dust caught by the fan does not clog the air inlet.

However, if the interval of the heat radiating fins is large, foreign matter entering from the outlet of the housing may pass through the heat radiating member. Thus, the foreign matter may reach the precise electronic components leading to a failure of the electronic device e.g., s a short circuit.

SUMMARY

According to an aspect of an embodiment, an electronic device includes a housing including an air outlet, a heat generating component in the housing and a heat sink in the housing. The heat sink includes a heat radiating member and a heat conducting member. The heat radiating member may includes plurality of heat radiating fins arrayed, the plurality of heat radiating member fins may include a plurality of air flow paths formed between adjacent pairs of the heat radiating fins. An air outlet may face the air outlet of the housing and an air inlet may be located in a side remote from the air outlet of the heat radiating fins. The heat conducting member contacts the heat generating component to absorb heat and conducts the heat to the heat radiating member. A fan may be in the housing feeding air to the air inlet of the heat radiating member to exhaust heat of the heat radiating fins from the air outlet of the housing. The air outlet of the housing may include a plurality of openings arrayed that divide the air flow paths formed between the pairs of heat radiating fins of the heat radiating member, as viewed in the direction looking from outside the housing to the air outlet.

These together with other aspects and advantages which will be subsequently apparent reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

Figure 1:
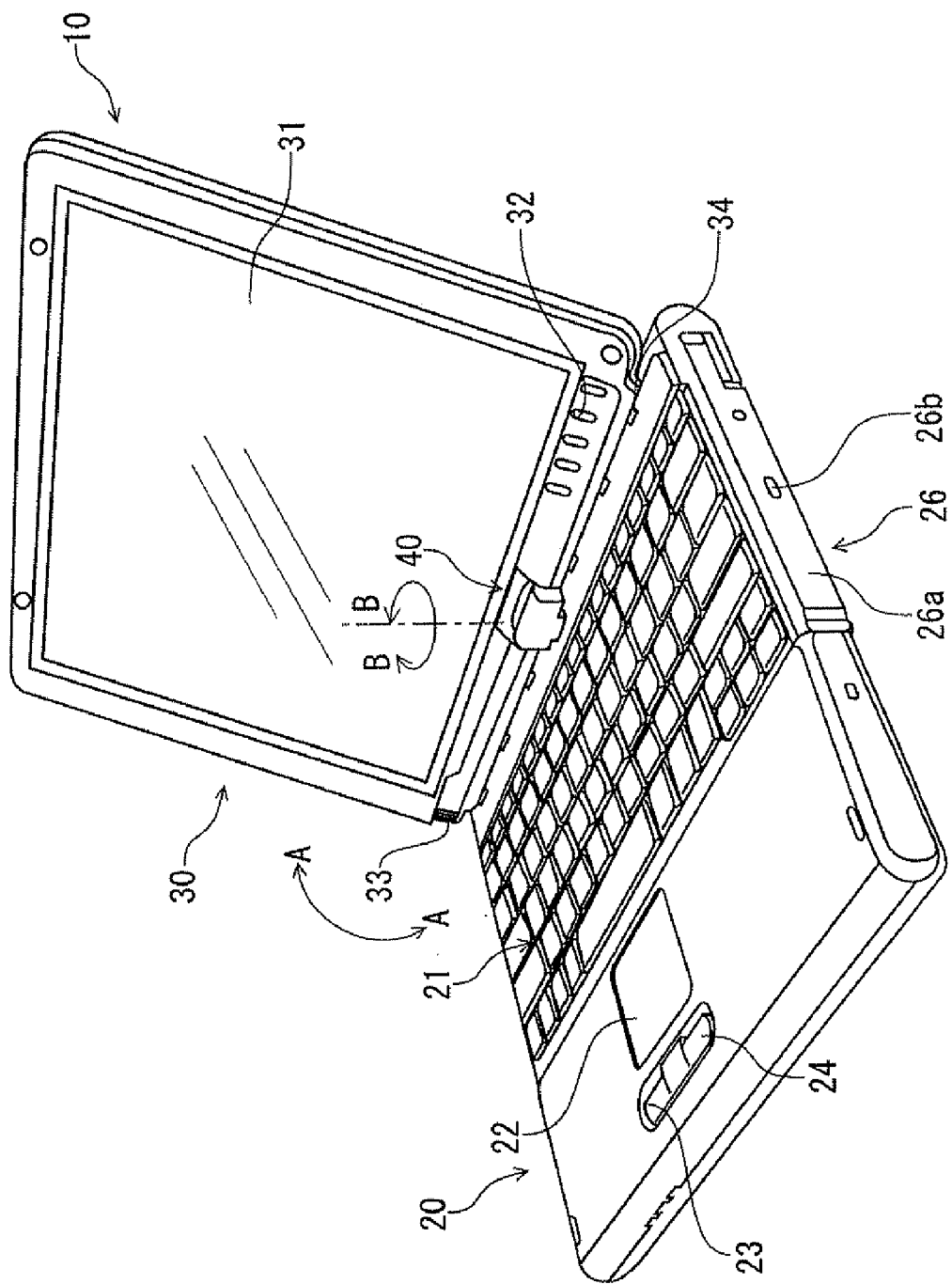
FIG. 1 illustrates a personal computer which is an example embodiment of an example electronic device.

FIG. 1 illustrates an example personal computer that is an example embodiment of an electronic device.

The personal computer 10 illustrated in FIG. 1 may include as an input device an electromagnetic induction type digitizer mounted on the back side of a display screen 31, and detect a position on the display screen 31 indicated by a stylus. By such an example configuration, the personal computer 10 may input by indication. This input device may be a touch panel mounted on the display screen 31, instead of the digitizer and stylus.

The personal computer 10 may include a main body unit 20 and a display unit 30. The display unit 30 may be connected to the main body unit 20 by a biaxial connector unit 40 so as to be openable and closable in the direction of an arrow A-A and rotatable in the direction of an arrow B-B (about a rotational axis perpendicular to the main body unit 20) with respect to the main body unit 20. FIG. 1 illustrates the personal computer 10 in a state in which the display unit 30 is opened with respect to the main body unit 20 (an open state). This open state may correspond is a first state of use. The main body unit 20 is an example of a processing unit. The display unit 30 is an example of a display unit. The connecting portion 40 is an example of a connector member.

The main body unit 20 may include a keyboard 21, a track pad 22, a left click button 23 and a right click button 24. The main body unit 20 further may include a display unit receiving member 34 for preventing rattling of the display unit 30. The display unit receiving member 34 is made of rubber, for example. The main body unit 20 also may include on one side thereof an opening and closing cover 26a for an optical disk drive 26 in which an optical disk such as a CD or DVD is mounted to be driven and accessed. The opening and closing cover 26a may include an eject button 26b which is pressed to open the opening and closing cover 26a. The keyboard 21 is an example of a keyboard.

The display unit 30 of the personal computer 10 may include on the front surface thereof a display screen 31. The display unit 30 may include several press buttons 32 in the right end below the display screen 31. The display unit 30 also may include on the left end thereof a fingerprint sensor 33 which performs fingerprint authentication by being traced with a fingertip. The display screen 31 is an example of a display screen. In the open state illustrated in FIG. 1, information is displayed on the display screen 31 with the direction of the rotational axis B-B of the display unit 30 as the up-and-down direction.

Figure 2:
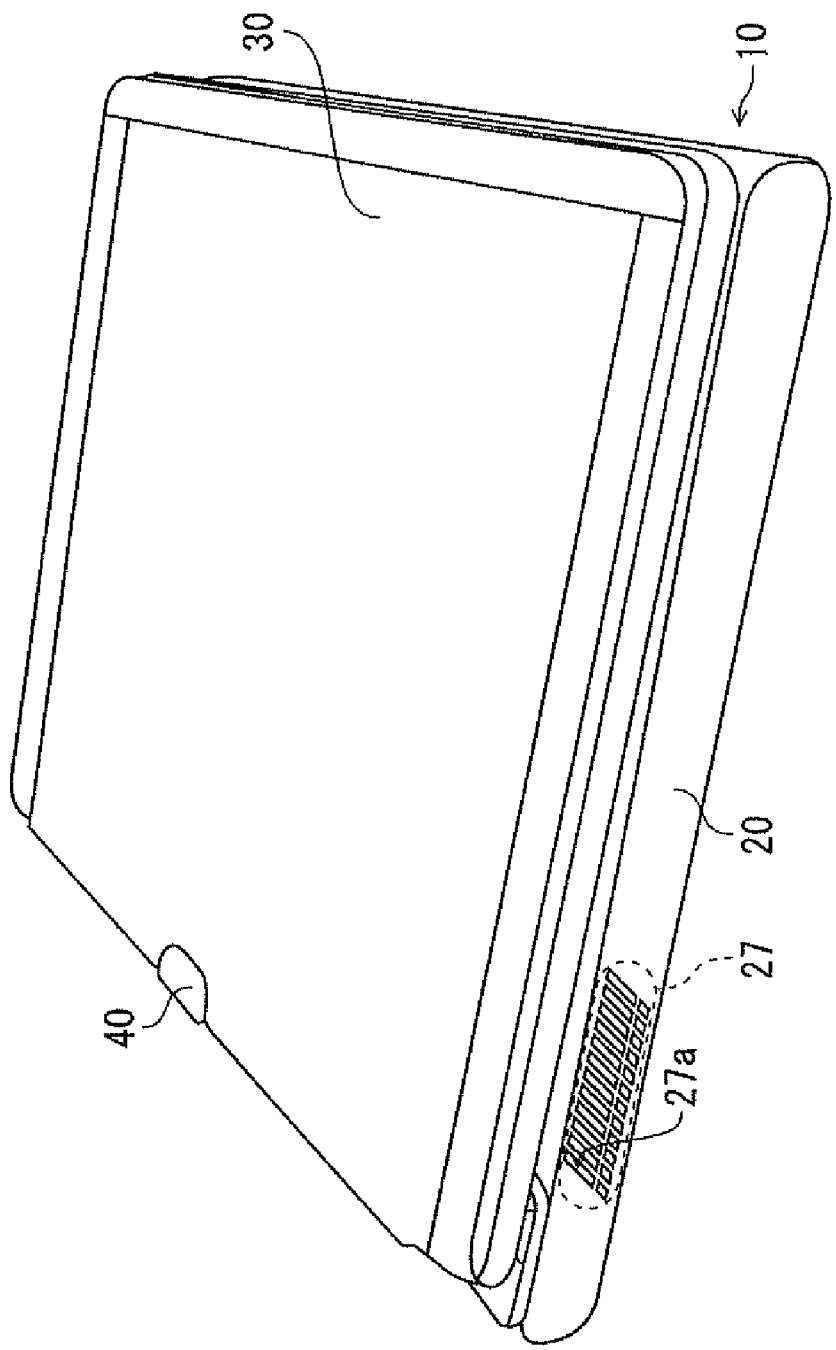
FIG. 2 illustrates an example personal computer with a display unit closed over a main body unit.

FIG. 2 illustrates a personal computer with the display unit closed over the main body unit. In FIG. 2, the display unit 30 is in a state of being overlaid on the main body unit 20 with the display screen 31 (see FIG. 1) facing the main body unit 20. Hereafter, this state is referred to as a first closed state.

Upon closing the display unit 30 along the direction of the arrow A from the open state illustrated in FIG. 1, the personal computer 10 gets in the first closed state, where the display screen 31 may be hidden inside and the back surface with respect to the display screen 31 may be exposed outside, as illustrated in FIG. 2. The personal computer 10 in the first closed state can avoid staining or breakage of the display screen 31, providing portability.

As illustrated in FIG. 2, an outlet 27 is provided in a side of the main body unit 20. The outlet 27 radiates heat generated by various electronic components contained in the main body unit 20. The outlet 27 includes of a plurality of slits 27a extending obliquely with respect to the thickness direction of the main body unit 20. The outlet 27 is an example of an air outlet. The slit 27a is an example of an opening.

The hot air which has absorbed heat in the main body unit 20 is exhausted from the outlet 27. Since the outlet 27 is provided in a side of the main body unit 20, it will not interfere with operation by a user.

Figure 3:
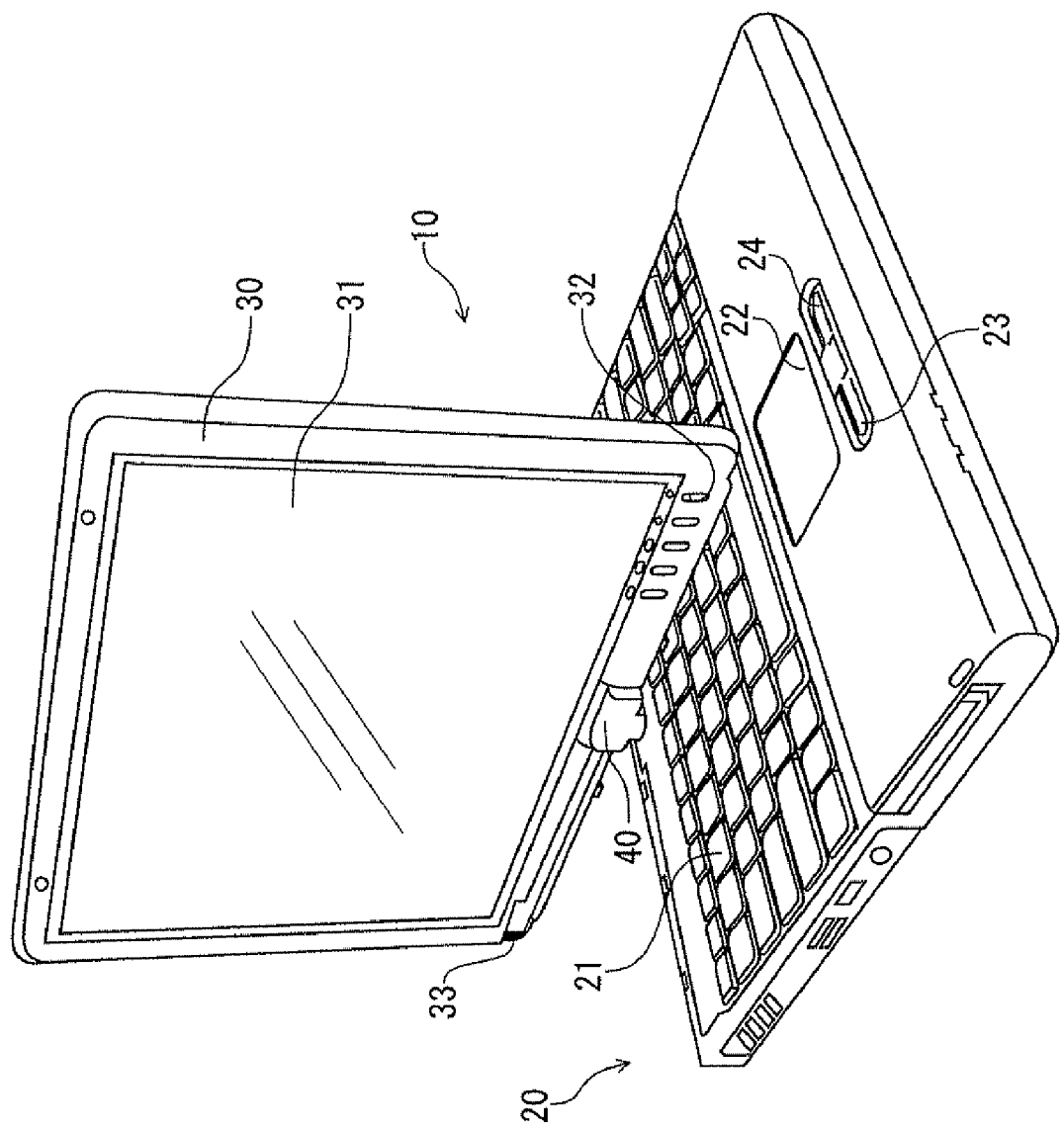
FIG. 3 illustrates an example personal computer with the display unit rotated substantially 90 degrees with respect to the main body unit.

FIG. 3 illustrates a personal computer with the display unit rotated substantially 90 degrees with respect to the main body unit.

The display unit 30 of the personal computer 10 can be rotated from the state illustrated in FIG. 1 via the state illustrated in FIG. 3 until the back side of the display screen 31 faces the front.

Figure 4:
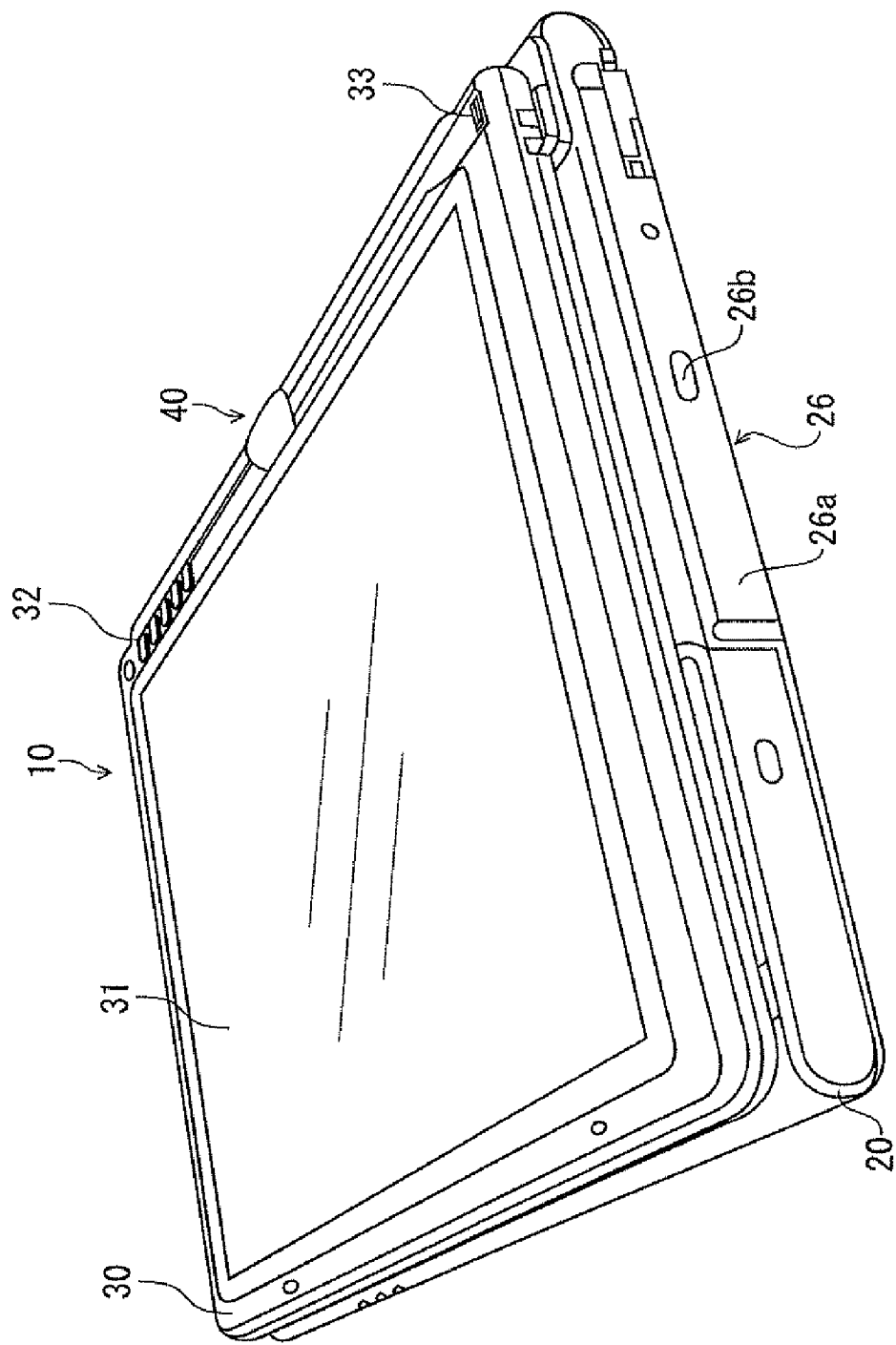
FIG. 4 illustrates an example personal computer, the display unit being overlaid on the main body unit with the display screen facing upward.

FIG. 4 illustrates a personal computer, the display unit being overlaid on the main body unit with the display screen facing upward. The personal computer 10 gets in a second closed state illustrated in FIG. 4 upon the display unit 30 is overlaid on the main body unit with the back surface thereof with respect to the display screen 31 facing the main body unit 20 after the display unit 30 may include been rotated from the state illustrated in FIG. 1 via the state illustrated in FIG. 3 until the back side of the display screen 31 faces the front. This second closed state is an example of a second state of use. Hereafter, "tablet mode" refers to an operation mode where the personal computer 10 is used in the second closed state.

As described above, the display screen 31 is a display screen with a pen input function, the display screen 31 having on the back side thereof an electromagnetic induction type digitizer for detecting the indicated position on the display screen. Usually, a user holds the personal computer 10 which is in the tablet mode with one arm, and operates the display screen with a stylus (not illustrated) in the other hand. In relation to the line of sight upon holding the personal computer 10 which is in the tablet mode, the displayed image on the display screen 31 has the orientation thereof rotated 90 degrees from the open state illustrated in FIG. 1. That is, in the tablet mode, information is displayed on the display screen 31 with a direction perpendicular to the rotational axis of the display unit 30 as the up-and-down direction.

Figure 5:
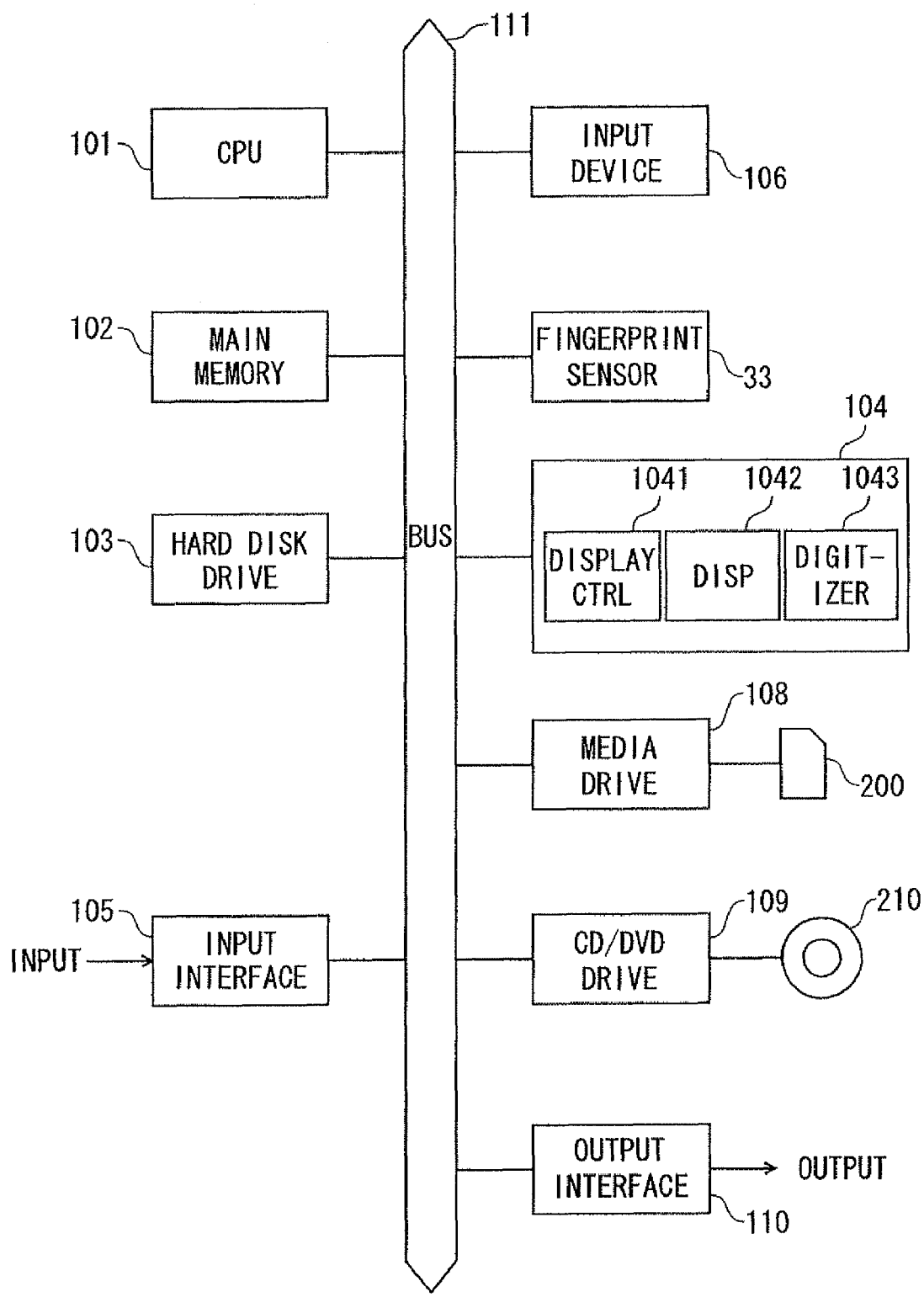
FIG. 5 illustrates an example internal configuration of an example personal computer.

FIG. 5 is illustrates an example internal configuration the personal computer 10. As illustrated in FIG. 5, the personal computer 10 includes a CPU 101, a main memory 102, a hard disk drive 103, a display mechanism 104, an input device 106, a small recording media drive 108, a CD/DVD drive 109, an input interface 105, an output interface 110, a fingerprint sensor 33 illustrated in FIG. 1 and the like. These various elements may be interconnected via bus 111. The CPU 101 executes various programs. In the main memory 102 are developed programs read from the hard disk drive 103 for execution by the CPU 101. The hard disk drive 103 stores various programs, data and the like. The display mechanism 104 conducts processes relating to displaying information. The input device 106 includes the keyboard 21, the track pad 22 and the like. The small recording media drive 108 accesses a small recording medium 200 loaded therein. The CD/DVD drive 109 accesses a CD-ROM 210 or DVD loaded therein. The input interface 105 inputs data from external devices. The output interface 110 outputs data to external devices. The display mechanism 104 is comprised of a display controller 1041, a display 1042 and a digitizer 1043. The display controller 1041 controls the direction and the like of information displayed on the display screen 31 illustrated in FIG. 1. The display 1042 displays information on the display screen 31. The digitizer 1043 is mounted on the back side of the display screen 31 and detects the position indicated by a stylus. The CPU 101 is an example of a processing unit. The display controller 1041 is an example of a display control unit.

The personal computer 10 of an example embodiment prevents intrusion of foreign matter from the outlet 27 illustrated in FIG. 2 while at the same time efficiently radiating heat generated by the CPU 101 and the like.

Figure 6:
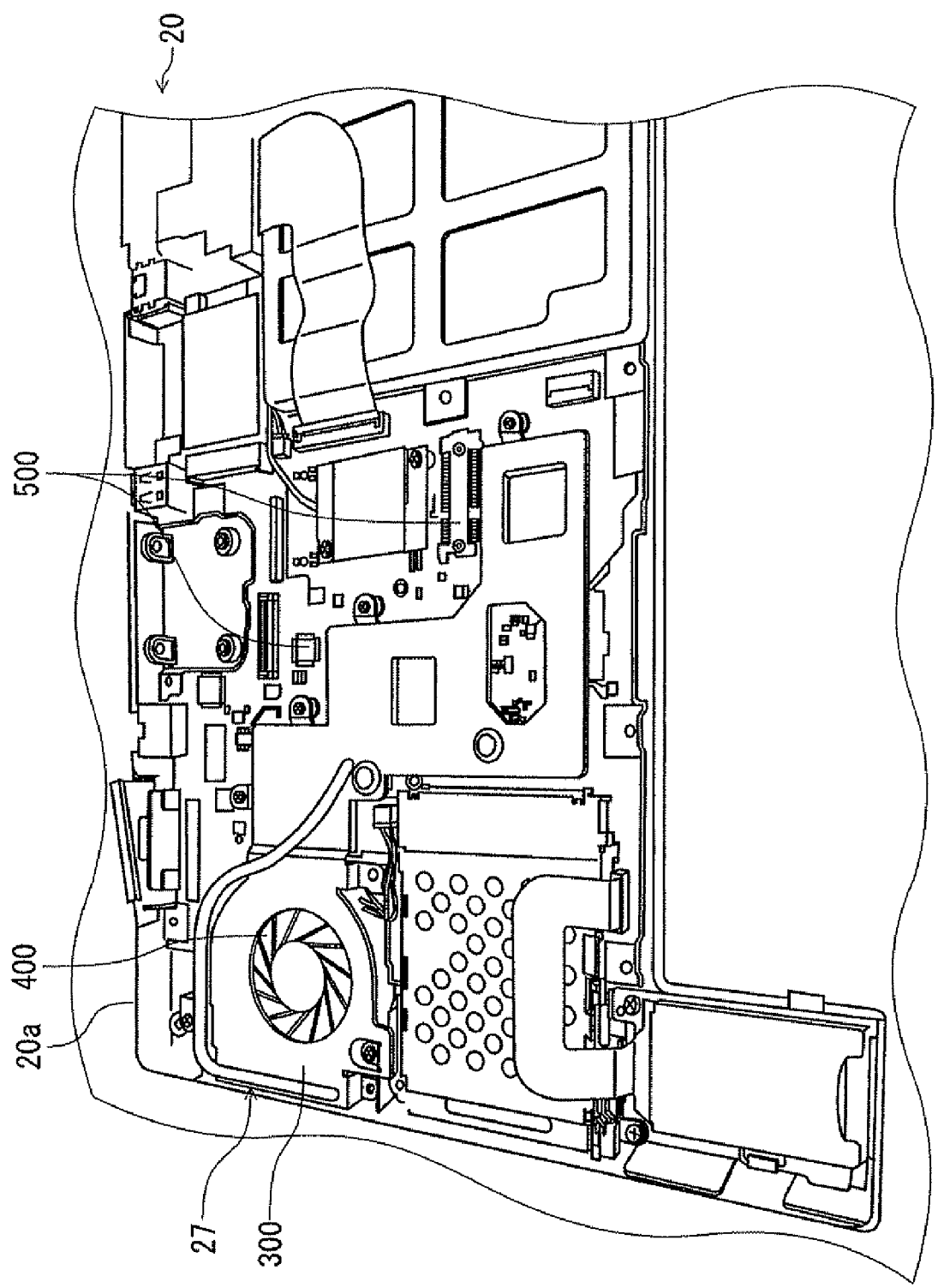
FIG. 6 illustrates an example internal construction of the main body unit.

FIG. 6 illustrates the internal configuration of the main body unit 20. The main body unit 20 accommodates various components in a housing 20a. The housing 20a may include a circuit board on which electronic components 500 are mounted. The electronic components 500 include the CPU 101 illustrated in FIG. 5 (not illustrated in FIG. 6 since it is under a heat sink 300). The heat sink 300 extends over the plurality of electronic components 500 to the outlet 27. A fan 400 is arranged nearer the outlet 27 than the various electronic components 500 are. The fan 400 discharges air to the outlet 27. The electronic components 500 is an example of heat generating components.

Figure 7:
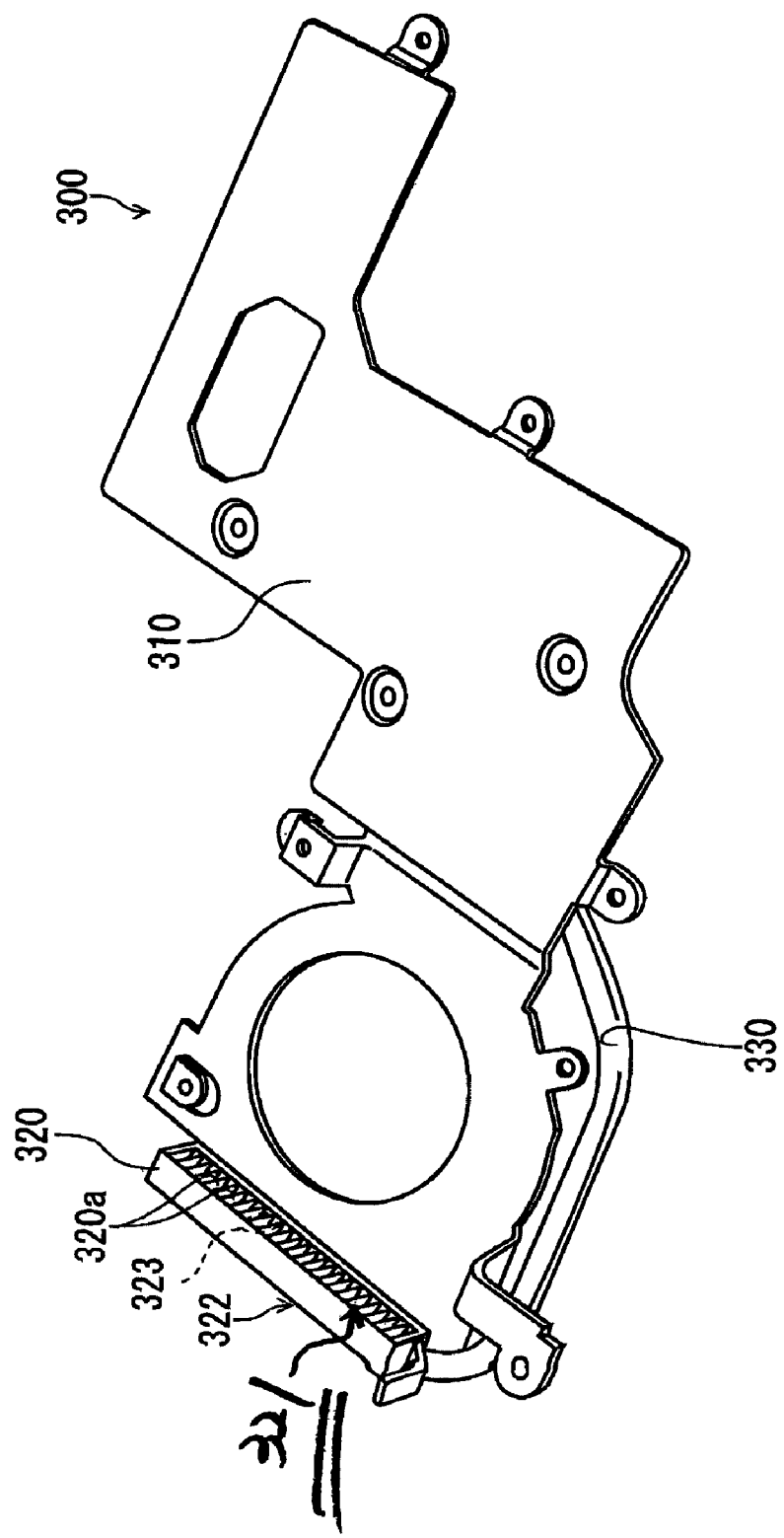
FIG. 7 illustrates an example heat sink.

FIG. 7 illustrates the heat sink 300. FIG. 7 shows the side of the heat sink 300 opposite the side illustrated in FIG. 6. The heat sink 300 may include a plurality of fins 380 in the form of thin plates arrayed in parallel. The heat sink 300 includes of a heat radiating member 320, a heat conducting member 310 and a heat pipe 330. The heat radiating member 320 is arranged facing the outlet 27. The heat conducting member 310 contacts the electronic components 500 to absorb heat generated by the electronic components 500, and conducts the heat to the heat radiating member 320. The heat pipe 330 extends from the heat radiating member 320 to the heat conducting member 310. The heat radiating member 320 may include a flow path 323 for air from the fan 400 formed by the spaces between each of the plurality of fins 380. The heat radiating member 320 may include an air inlet 321 facing the fan 400 and an air flow exit 322 facing the outlet 27 respectively formed by the plurality of fins 380 which are arrayed.

Heat generated by the plurality of electronic components 500 illustrated in FIG. 6 is absorbed by the heat conducting member 310 and conducted to the heat radiating member 320. The heat conducting member 310 may include a broad surface. The plurality of electronic components 500 includes electronic components which generate large amounts of heat such as the CPU 101, for example. The heat conducting member 310 is in close contact with the electronic components which generate large amounts of heat. The air inlet 321 of the heat radiating member 320 faces the fan 400. Air from the fan 400 flows from the air inlet 321 of the heat radiating member 320 into the flow path 323 and, after absorbing the heat conducted to the plurality of fins 320a, flows out from the air flow exit 322 to be discharged from the outlet 27. In an example embodiment, since a heat sink 300 contacts a plurality of electronic components 500, heat generated from the plurality of electronic components 500 can be efficiently radiated without increasing the size of the device.

Figure 8:
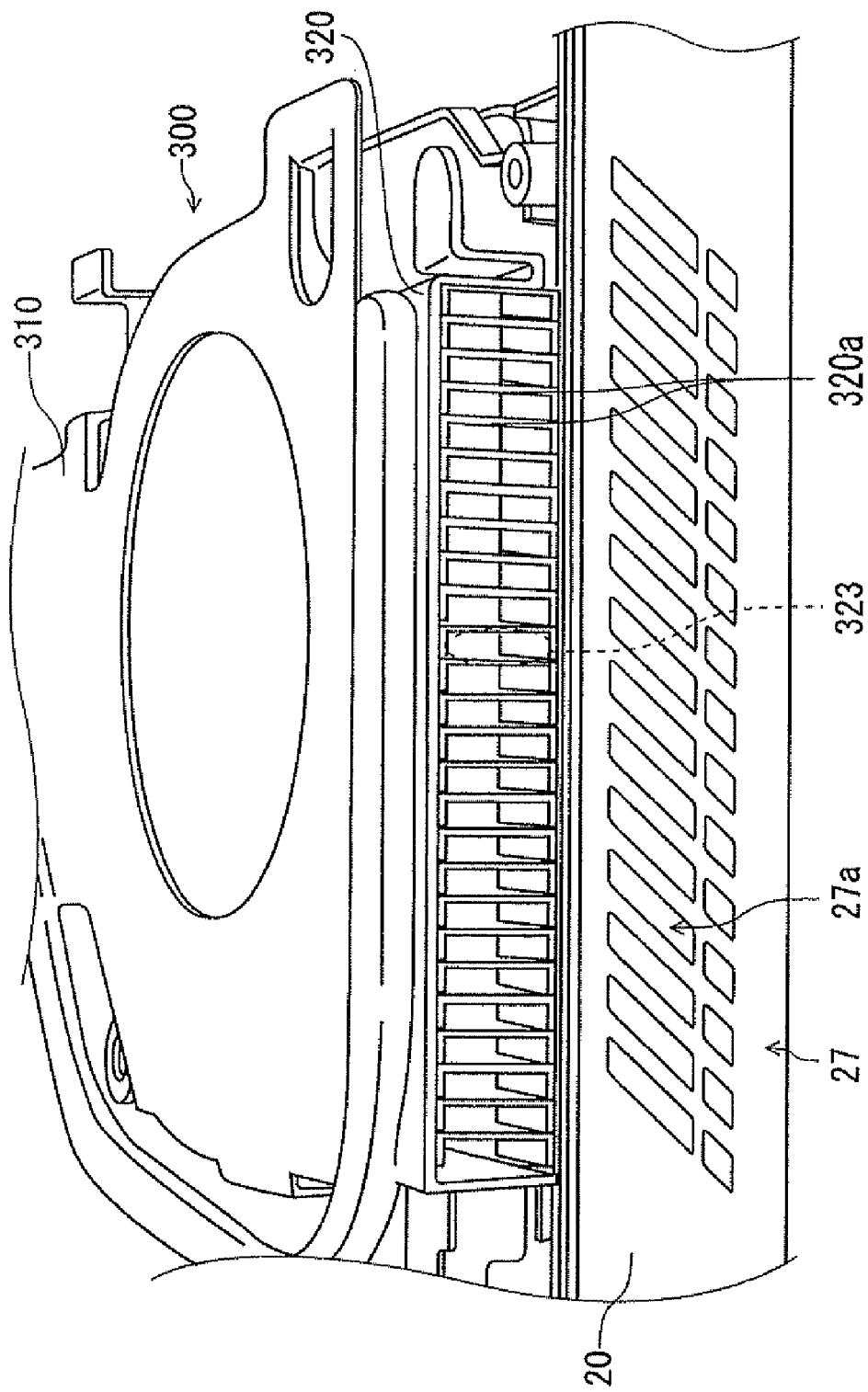
FIG. 8 illustrates an example relationship between a flow path of a heat radiating member and an outlet.

FIG. 8 illustrates the relationship between the flow path 323 of the heat radiating member 320 and the outlet 27. As illustrated in FIG. 8, the plurality of fins 320a in the heat radiating member 320 of the heat sink 300 are provided extending upward in the thickness direction of the main body unit 20 and arrayed. On the other hand, the slits 27a provided in the outlet 27 are formed to be oblique with respect to the thickness direction of the main body unit 20. Therefore, upon the heat radiating member 320 of the heat sink 300 is arranged facing the outlet 27, the flow path 323 of the heat radiating member 320 is divided by the slit 27a of the outlet 27.

Figure 9:
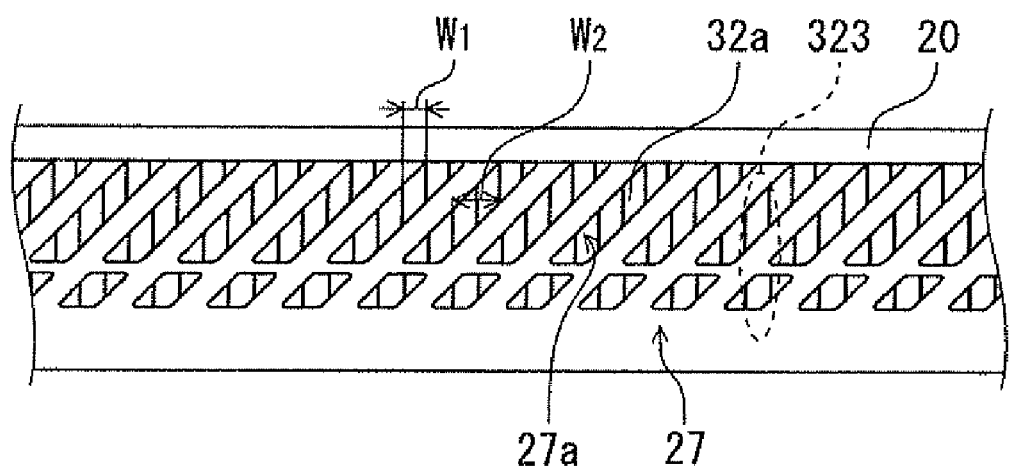
FIG. 9 is illustrates an example outlet of the main body unit with the heat sink

FIG. 9 is an enlarged view around the outlet 27 of the main body unit 20 with the heat sink 300. As illustrated in FIG. 9, the flow path 323 formed by the fins 320a of the heat sink 300 is divided by the slit 27a. This can prevent a malfunction in which a failure of the personal computer is caused by foreign matter such as trash entering from the outlet 27, an accident in which a screwdriver or the like is inserted from the outlet 27 to short-circuit the electronic component 500, and so on. The example embodiment is designed so that the pitch width W1 of adjacent fins 320a is smaller than the width W2 of the slit 27a. As a result, the hot air having gone through the flow path 323 is efficiently discharged from the outlet 27. Moreover, an example embodiment prevents intrusion of foreign matter entering from the outlet 27. Therefore, the pitch width W1 of the fins 320a of the heat sink 300 does not need to be too narrow. In this way, an example embodiment prevents the problem that dust caught by the fan 400 clogs the air inlet 321 of the heat radiating member 320 to lower the efficiency of the heat radiation.

An example embodiment may include a conventional heat sink 300. But, the shape of the slit 27a of the outlet 27 provided in the main body unit 20 may differ from a conventional one. The heat sink 300 may include a metal of high heat conductivity, which is difficult to work with compared to plastic or the like composing the housing 20a of the main body unit 20. In an example embodiment, the shape of the slit 27a of the outlet 27 is changed to adjust the relative relationship between the flow path 323 and the slit 27a. As a result, an example embodiment readily achieves both of prevention of foreign matter intrusion and maintenance of heat radiation efficiency without major changes in manufacturing processes.

Although the above example embodiment illustrates an example in which the housing is provided with an outlet in which slits are arrayed, the air outlet may be one in which a plurality of round through-holes are arrayed and divide the air flow path of the heat sink.

Although the above example embodiment illustrates as an electronic device a tablet-type personal computer, the device may be a personal computer not including the tablet function or may be an electronic organizer or the like.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The invention claimed is:

1. An electronic device comprising:
a housing including an air outlet;
a heat generating component in the housing;
a heat sink in the housing, the heat sink comprising:
   a heat radiating member, and
   a heat conducting member, the heat radiating member including a plurality of heat radiating fins arrayed, the plurality of heat radiating member fins having a plurality of air flow paths formed between adjacent pairs of the heat radiating fins, an air outlet which faces the air outlet of the housing and an air inlet which is in a side remote from the air outlet of the heat radiating fins, and the heat conducting member contacting the heat generating component to absorb heat and conducting the heat to the heat radiating member; and
a fan in the housing, the fan feeding air to the air inlet of the heat radiating member to exhaust heat of the heat radiating fins from the air outlet of the housing;
wherein the air outlet of the housing includes a plurality of openings arrayed and a part of the housing between each of the respective openings that divide the air flow paths formed between the pairs of heat radiating fins of the heat radiating member, as viewed in a direction looking from outside the housing to the air outlet of the housing.

2. The electronic device according to claim 1, wherein
the housing is in a form of a plate,
the arrayed heat radiating fins extend upward in a thickness direction of the housing, and
the air outlet of the housing includes the plurality of openings in a form of slits extending obliquely with respect to the thickness direction of the housing.

3. The electronic device according to claim 2, wherein the air outlet of the housing is formed in a side of the housing.

4. The electronic device according to claim 1, further comprising a plurality of the heat generating components,
wherein the heat conducting member contacts the plurality of heat generating components to absorb heat and conducts heat of the plurality of heat generating components to the heat radiating member.

5. The electronic device according to claim 1, wherein
the housing is an processing unit containing a processing circuit which performs arithmetic processing, and
the heat conducting member contacts the processing circuit which is the heat generating component to absorb heat.

6. The electronic device according to claim 5, wherein
the processing unit has a keyboard for inputting an instruction in response to user operation on an upper surface thereof, and
the electronic device has a display unit having a display screen connected to the processing unit so as to be openable and closable.

7. The electronic device according to claim 6, wherein the display unit is connected to the processing unit by a biaxial connector member which is rotatable about a rotational axis perpendicular to the upper surface of the processing unit upon the display unit being in an open state with respect to the processing unit.

8. The electronic device according to claim 7, further comprising:
a display controller displaying information on the display screen in a first display mode and a second display mode, the first display mode to display the information on the display screen with the direction of the rotational axis as an up-and-down direction in a first state of use in which the display unit is opened with respect to the processing unit and the second display mode to display the information on the display screen with a direction perpendicular to the rotational axis as an up-and-down direction in a second state of use in which the display unit is overlaid on the processing unit with the display screen facing outside.

9. An electronic device comprising:
a housing including an air outlet;
a heat generating component in the housing;
a heat sink in the housing, the heat sink comprising:
a heat radiating member, and
a heat conducting member, the heat radiating member including a plurality of heat radiating fins arrayed, the plurality of heat radiating member fins having a plurality of air flow paths formed between adjacent pairs of the heat radiating fins, an air outlet which faces the air outlet of the housing and an air inlet which is in a side remote from the air outlet of the heat radiating fins, and the heat conducting member contacting the heat generating component to absorb heat and conducting the heat to the heat radiating member; and
a fan in the housing, the fan feeding air to the air inlet of the heat radiating member to exhaust heat of the heat radiating fins from the air outlet of the housing;
wherein the air outlet of the housing includes a plurality of openings arrayed which divide the air flow paths formed between the pairs of heat radiating fins of the heat radiating member, as viewed in a direction looking from outside the housing to the air outlet of the housing, and
wherein the plurality of openings includes a slit width wider than an array pitch of the heat radiating fins.

* * * * *

UNITED STATES PATENT AND TRADEMARK OFFICE
CERTIFICATE OF CORRECTION

| | | |
|---|---|---|
| PATENT NO. | : 7,924,563 B2 | Page 1 of 1 |
| APPLICATION NO. | : 12/146910 | |
| DATED | : April 12, 2011 | |
| INVENTOR(S) | : Sonomasa Kobayashi et al. | |

It is certified that error appears in the above-identified patent and that said Letters Patent is hereby corrected as shown below:

Column 8, Line 9 (Approx.), In Claim 8, delete "unit" and insert --unit,--, therefor.

Signed and Sealed this
Eighteenth Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,924,563 B2 | Page 1 of 1 |
| APPLICATION NO. | : 12/146910 | |
| DATED | : April 12, 2011 | |
| INVENTOR(S) | : Sonomasa Kobayashi et al. | |

It is certified that error appears in the above-identified patent and that said Letters Patent is hereby corrected as shown below:

Column 1, Line 8, Delete "Paten" and insert --Patent--, therefor.

Signed and Sealed this
Sixth Day of December, 2011

David J. Kappos
*Director of the United States Patent and Trademark Office*